(12) United States Patent
Makeev et al.

(10) Patent No.: US 12,413,752 B2
(45) Date of Patent: Sep. 9, 2025

(54) IMAGE PROCESSING

(71) Applicant: V-NOVA INTERNATIONAL LIMITED, London (GB)

(72) Inventors: Ivan Makeev, London (GB); Balázs Keszthelyi, London (GB); Stergios Poularakis, London (GB); Michele Sanna, London (GB); Robert Ettinger, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 838 days.

(21) Appl. No.: 16/769,798

(22) PCT Filed: Dec. 6, 2018

(86) PCT No.: PCT/GB2018/053556
§ 371 (c)(1),
(2) Date: Jun. 4, 2020

(87) PCT Pub. No.: WO2019/111014
PCT Pub. Date: Jun. 13, 2019

(65) Prior Publication Data
US 2021/0176484 A1  Jun. 10, 2021

(30) Foreign Application Priority Data

Dec. 6, 2017 (EP) ..................................... 17386047

(51) Int. Cl.
*H04N 19/33* (2014.01)
*H04N 19/154* (2014.01)
(Continued)

(52) U.S. Cl.
CPC ........... *H04N 19/33* (2014.11); *H04N 19/154* (2014.11); *H04N 19/167* (2014.11); *H04N 19/17* (2014.11); *H04N 19/187* (2014.11); *H04N 19/46* (2014.11)

(58) Field of Classification Search
CPC ...... H04N 19/33; H04N 19/17; H04N 19/167; H04N 19/46; H04N 19/154; H04N 19/187
See application file for complete search history.

(56) References Cited

U.S. PATENT DOCUMENTS 6,137,914 A * 10/2000 Ligtenberg ............. H04N 19/30
375/E7.181
6,281,874 B1   8/2001 Sivan et al.
(Continued)

FOREIGN PATENT DOCUMENTS

CN   1985514 A   6/2007
CN  103155585 A   6/2013
(Continued)

OTHER PUBLICATIONS

Athanassios et al., "The JPEG 2000 Still Image Compression Standard", IEEE Signal Processing Magazine, IEEE Service Center, Piscataway, NJ, US, vol. 18, No. 5, Sep. 1, 2001, pp. 36-58, XP011092358, ISSN: 1053-5888, DOI: 10.1109/79.952804.
(Continued)

*Primary Examiner* — Justin W Rider
(74) *Attorney, Agent, or Firm* — Workman Nydegger

(57) ABSTRACT

First compressed data is decoded to obtain a representation of an image at a first level of quality which is output for display. In response to a predetermined trigger event, second compressed data is decoded to obtain reconstruction data, and the reconstruction data is used to reconstruct a representation of part of the image at a second, higher level of quality using the representation at the first level of quality.

(Continued)

The representation of part of the image is output for display at the second level of quality.

11 Claims, 3 Drawing Sheets

(51) Int. Cl.
  *H04N 19/167* (2014.01)
  *H04N 19/17* (2014.01)
  *H04N 19/187* (2014.01)
  *H04N 19/46* (2014.01)

(56) References Cited

U.S. PATENT DOCUMENTS

| | | | | |
|---|---|---|---|---|
| 8,531,321 | B1* | 9/2013 | Rossato | H04N 19/436 341/51 |
| 10,965,780 | B2* | 3/2021 | Gorin | G06F 16/955 |
| 2003/0142872 | A1* | 7/2003 | Koyanagi | H04N 21/6587 375/E7.079 |
| 2004/0175059 | A1 | 9/2004 | Willner et al. | |
| 2005/0048916 | A1* | 3/2005 | Suh | H04N 21/4622 455/39 |
| 2005/0213833 | A1* | 9/2005 | Okada | H04N 19/132 375/E7.184 |
| 2008/0095450 | A1 | 4/2008 | Kirenko | |
| 2010/0158398 | A1* | 6/2010 | Noguchi | H04N 19/17 382/232 |
| 2011/0019910 | A1* | 1/2011 | Kameyama | H04N 19/124 382/163 |
| 2012/0169593 | A1* | 7/2012 | Mak | G06F 3/0485 345/157 |
| 2015/0256840 | A1* | 9/2015 | Sato | H04N 19/46 375/240.03 |
| 2018/0103050 | A1* | 4/2018 | Mason | H04L 63/168 |
| 2019/0018830 | A1* | 1/2019 | Mou | G06F 16/986 |

FOREIGN PATENT DOCUMENTS

| | | |
|---|---|---|
| WO | 2001-069585 | 9/2001 |
| WO | 2012/021246 A2 | 2/2012 |

OTHER PUBLICATIONS

International Search Report and Written Opinion for PCT/GB2018/053556 mailed Mar. 11, 2019.
Office Action received for Chinese Patent Application No. 201880088544.4, mailed on Feb. 7, 2024, 20 pages (10 pages of English Translation and 10 pages of Original Document).
Office Action received for Chinese Patent Application No. 201880088544.4, mailed on Jun. 27, 2024, 12 pages (6 pages of English Translation and 6 pages of Original Document).
Office Action received for European Patent Application No. 18826093.9, mailed on Mar. 1, 2023, 5 pages.

* cited by examiner

IMAGE PROCESSING

The present application is a 371 US Nationalization of International Patent Application No. PCT/GB2018/053556, filed Dec. 6, 2018, which claims priority to European Patent Application No. 17386047.9, filed Dec. 6, 2017 the entire disclosures of which are incorporated herein by reference.

BACKGROUND

Compression of images is a consideration in many known systems. Images may be compressed and encoded, for example for transmission over a network and/or for storage in a storage medium. One example of such a system is the receiving, processing and/or displaying of images as media content on web pages. Such images may be downloaded, processed and/or rendered by a browser engine operating on a user device, for example.

Considerations in such systems include an amount of data that is to be downloaded, an amount of processing that is to be performed, an efficiency of image coding, a perceived visual quality of an image, a quality of user experience, and a convenience of use, among others.

In some known systems, images are transmitting, stored, received and/or processed at multiple different levels of quality. For example, a thumbnail version of an image may be stored in addition to a 'full resolution' version of the image.

SUMMARY

In some aspects, there is provided a method of processing image data, the method comprising: obtaining a representation of an image at a first level of quality; obtaining reconstruction data useable to reconstruct a representation of the image at a second, higher level of quality using the representation at the first level of quality; arranging the representation at the first level of quality and data useable to derive the reconstruction data into a compressed data stream; and outputting the compressed data stream for processing by a device to enable the device to reconstruct the representation at the second level of quality. The representation at the first level of quality may comprise a thumbnail image. The first level of quality may comprise a first image resolution and the second level of quality comprises a second, higher image resolution. The method may further comprise outputting the compressed data stream via a network. The method may be performed by a server system. The first level of quality and the second level of quality may be part of a hierarchical image processing arrangement. The method may further comprise obtaining the representation at the first level of quality comprises downsampling the representation at the second level of quality. The obtaining the reconstruction data may further comprise: upsampling the representation at the first level of quality to derive a preliminary representation of the image at the second level of quality; and deriving the reconstruction data based on a comparison between the representation at the second level of quality and the preliminary representation at the second level of quality. The method may further comprise obtaining further reconstruction data useable to reconstruct a representation of the image at a third, even higher level of quality using the representation at the second level of quality; and arranging the further reconstruction data in the compressed data stream to enable the device to reconstruct the representation at the third level of quality.

In some aspects, there is provided a method of processing image data, the method comprising: receiving first compressed data which, when decoded, is useable to obtain a representation of an image at a first level of quality; decoding the first compressed data to obtain the representation at the first level of quality; outputting for display the representation at the first level of quality; and in response to a predetermined trigger event: decoding second compressed data to obtain reconstruction data, the reconstruction data being useable to reconstruct a representation of part of the image at a second, higher level of quality using the representation at the first level of quality; reconstructing the representation at the second level of quality using the representation at the first level of quality and the reconstruction data; and outputting for display the representation at the second level of quality. The representation at the first level of quality may comprise a thumbnail image. The method may further comprise, in response to the predetermined trigger event, receiving the second compressed data. The first level of quality comprises a first image resolution and the second level of quality may comprise a second, higher image resolution. The predetermined trigger event may comprise receiving user input. The predetermined trigger event may comprise a determination that a rendering of the representation at the first level of quality is completed. The predetermined trigger event may comprise a determination that the second compressed data has been received. The predetermined trigger event may comprise a determination that the reconstruction data has been derived using the second compressed data. The method may be performed at a user device. The predetermined trigger event may comprise a determination of an operating characteristic of the user device. The method may further comprise: decoding third compressed data to derive further reconstruction data, the further reconstruction data being useable to reconstruct a representation of part of the image at a third, even higher level of quality using the representation at the second level of quality; reconstructing the representation at the third level of quality using the representation at the second level of quality and the further reconstruction data; and outputting for display the representation at the third level of quality.

The third compressed data may be decoded in response to a further predetermined trigger event. The further predetermined trigger event may comprise the representation at the second level of quality being displayed. The further predetermined trigger event may comprise the representation at the second level of quality being reconstructed. The third compressed data may be obtained in parallel with the second compressed data. Outputting a representation of an image for display may comprise rendering the representation of the image by a browser engine. The reconstructing the representation of the image at the second level of quality may comprise: upsampling the representation of the image at the first level of quality to derive a preliminary representation of the image at the second level of quality; and combining the preliminary representation with the reconstruction data to obtain the representation of the image at the second level of quality.

In some aspects, there is provided a method of processing image data, the method comprising: decoding, at a device, first compressed data to obtain a first representation of an image at a first level of quality; determining whether the first level of quality has a predetermined relationship with one or more threshold levels of quality, the one or more threshold levels of quality being based on a display characteristic associated with the device; in response to determining that the first level of quality has the predetermined relationship with the one or more threshold levels of quality: decoding second compressed data to obtain reconstruction data useable to reconstruct a second representation of the image at a second, higher level of quality using the first representation; reconstructing the second representation using the first representation and the obtained reconstruction data; and outputting the second representation for display at the second level of quality; and in response to determining that the first level of quality does not have the predetermined relationship with the one or more threshold levels of quality, outputting the first representation for display at the first level of quality. The method may further comprise: determining whether the second level of quality has a further predetermined relationship with the one or more threshold levels of quality; and in response to determining that the second level of quality has the further predetermined relationship with the one or more threshold levels of quality: decoding third compressed data to obtain further reconstruction data useable to reconstruct a third representation of the image at a third, even higher level of quality using the second representation; reconstructing the third representation using the second representation and the further reconstruction data; and outputting the third representation for display at the third level of quality. The display characteristic may comprise an operating characteristic of the device. The operating characteristic may relate to a screen size of the device. The operating characteristic may relate to an orientation of the device. The operating characteristic may relate to a device type of the device. The operating characteristic may relate to a processing and/or a display capability of the device. The display characteristic may comprise a size of a display window on a screen of the device. The size of the display window may be defined in an ECMAScript specification using Hypertext Markup Language, HTML. The method may comprise determining the one or more threshold levels of quality. The method may comprise determining the display characteristic. The method may comprise, in response to determining that the first level of quality has the predetermined relationship with the one or more threshold levels of quality, receiving the second compressed data.

In some aspects, there is is provided a method of processing image data, the method comprising: receiving first compressed data which, when decoded, is useable to obtain a representation of an image at a first level of quality; decoding the first compressed data to obtain the representation at the first level of quality; causing the representation at the first level of quality to be displayed at the first level of quality; decoding second compressed data to obtain reconstruction data useable to enhance at least part of the displayed representation at the first level of quality to a second, higher level of quality; and using the reconstruction data to enhance said at least part of the displayed representation at the first level of quality to the second level of quality. The first level of quality may comprise a first image resolution and the second level of quality comprises a second, higher image resolution. Thee second compressed data may be decoded after the representation at the first level of quality is displayed. The second compressed data may be received from a server system in response to a request sent to the server system.

In some aspects, there is provided a method of processing image data, the method comprising: receiving first compressed data which, when decoded, is useable to obtain a representation of an image at a first level of quality; decoding the first compressed data to obtain the representation at the first level of quality; displaying the representation at the first level of quality; decoding second compressed data to obtain, for a selected target region of the image, reconstruction data useable to reconstruct a representation of the target region of the image at a second, higher level of quality using the representation at the first level of quality; reconstructing the representation of the target region of the image at the second level of quality using the received reconstruction data; and displaying the representation of the target region of the image at the second level of quality. The method may be performed by a browser engine, and wherein the representation of the target region may be displayed on a webpage. The method may further comprise selecting the target region of the image. The second compressed data may be received and/or decoded in response to a predetermined trigger event. The predetermined trigger event may comprise receiving user input. The predetermined trigger event may be related to use of an image zooming or image cropping function of a device. The target region of the image may correspond to a visible part of a display. The target region of the image may correspond to a gaze position of a user. The target region of the image may be selected based on user input. The target region of the image may be selected based on an operating characteristic of a device. The operating characteristic of the device may relate to a display characteristic of the device. The method may further comprise: decoding third compressed data to obtain, for a further region of the image, further reconstruction data useable to reconstruct a representation of the further region of the image at a further level of quality; reconstructing the representation of the further region of the image at the further level of quality using the received further reconstruction data; and displaying the representation of the further region of the image at the further level of quality. The further level of quality may be higher than the second level of quality. The further level of quality may be higher than the first level of quality and lower than the second level of quality.

In some aspects, there is provided a method of processing image data, the method comprising: obtaining a set of reconstruction data elements useable to reconstruct a representation of an image at a first level of quality using a representation of the image at a second, lower level of quality, each reconstruction data element in the set of reconstruction data elements corresponding to an image element in the representation at the first level of quality; receiving an indication of a desired output size of encoded data; deriving, based at least on the received indication, a data rate target for encoding each of the set of reconstruction data elements; encoding each of the set of reconstruction data elements in accordance with the respective derived data rate target to obtain the encoded data; and outputting the encoded data. The data rate target for encoding each of the set of reconstruction data elements may be derived based on an average data rate target for encoding the set of reconstruction data elements. The average data rate target may be constant over a given time period. One or more of the threshold levels of quality may be based on different image resolutions, target areas, or decoder device properties. One or more of the threshold levels of quality may be based on different image content categories, or based on the per-image values of quality metrics for different levels of quality, with said categories or metrics determined at either the server or the decoding device either before or not before the said image is requested by the device.

In some aspects, there is provided a method, where, the determination of a target area or a trigger event is followed by a message being passed to the server which prepares the server to allow the decoder to receive only restricted parts of the compressed data that exists on the server for each higher level of quality.

In some aspects, there is provided a method, where, the determination of a target area or a trigger event is followed by a message being passed to the server which causes the server to cause the encoder to produce modified compressed data for a higher level of quality, taking into account the size of all or of a restricted part of the modified compressed data in deriving data rate targets. The message may be passed to the server causes the server to cause the encoder to produce modified compressed data that preferentially allocates data rate to certain areas within reconstruction data elements, in order to give the target area more accuracy than achieved with unmodified compressed data.

Further, in some aspects there is provided an apparatus arranged to perform a method according to any of the above methods. Further, there is provided a computer program comprising instructions which, when executed, cause an apparatus to perform a method according to any of the above methods.

DESCRIPTION

Figure 1:
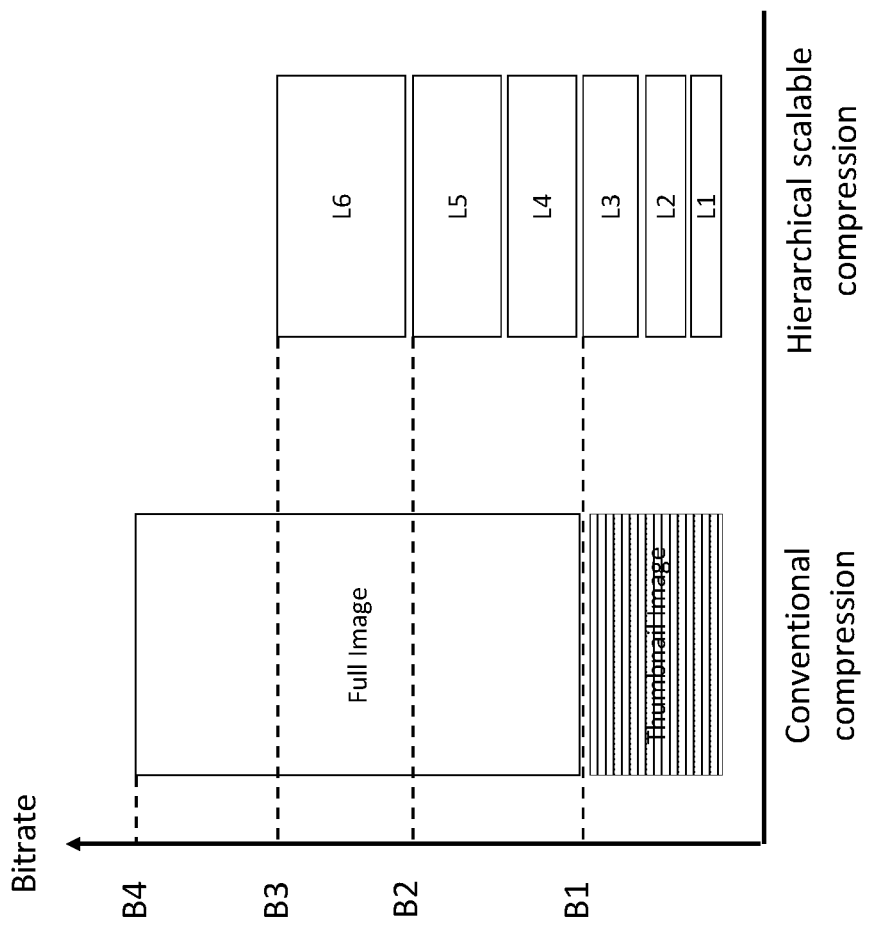
FIG. 1 shows an example of the use of hierarchical scalable compression and decompression of a still image, compared to conventional techniques.

Compared to some known techniques, examples described herein involve transmitting, receiving, storing and/or processing a relatively small amount of information associated with image compression at a given level of quality.

Examples described herein reduce an amount of network bandwidth that is used to download images compared to some known systems, for example for rendering and/or displaying images on a webpage.

Examples described herein improve an efficiency of coding image data compared to some known systems.

Examples described herein improve a quality of user experience compared to some known systems, by reducing network bandwidth usage, by reducing webpage latency, and/or by rendering images at a relatively high level of quality.

Certain examples described herein relate to devices having a client-server relationship. For example, a server system may communicate with one or more client devices via a data communications network. Examples of data communications network include, but are not limited to, the Internet, a Local Area Network (LAN) and a Wide Area Network (WAN).

In certain examples, a server system obtains a representation of an image at a first level of quality. The representation at the first level of quality may be derived based on a representation of the image at a second level of quality. The second level of quality is higher than the first level of quality. A level of quality as described herein may relate to an image resolution. Other examples of levels of quality include, but are not limited to, definition levels and quantization levels.

In some examples, the first and the second levels of quality are part of a hierarchical image processing arrangement. Such a hierarchical image processing may comprise multiple tiers each corresponding to a different level of quality. A representation of an image at a given level of quality as described herein may refer to image data, for example pixel data, at the given level of quality. The reader is referred to UK patent application no. GB1603727.7, which describes a hierarchical arrangement in more detail. The entire contents of GB1603727.7 are incorporated herein by reference.

The representation at the first level of quality may be obtained by downsampling the representation at the second level of quality.

In some examples, the representation at the first level of quality comprises a thumbnail image. In some examples, the representation at the first level of quality comprises a preview image.

Reconstruction data useable to reconstruct the representation of the image at the second, higher level of quality is obtained using the representation at the first level of quality. Reconstruction data is data that is useable to reconstruct a representation of an image at a given level of quality based on a representation of the image at a lower level of quality. In some examples, the reconstruction data is derived by upsampling the representation at the first level of quality to obtain a preliminary representation at the second level of quality. The preliminary representation at the second level of quality may be compared with the 'original' representation at the second level of quality (e.g. the representation that is to be reconstructed) to obtain the reconstruction data. The reconstruction data may comprise a set of reconstruction data elements. Each reconstruction data element in the set of reconstruction data elements may correspond to a different image element, for example pixel, in the representation at the second level of quality.

The representation of the image at the first level of quality and data useable to derive the reconstruction data are arranged into a data stream. The data useable to derive the reconstruction data may comprise encoded reconstruction data. The data stream is then output for processing by a device to enable the device to reconstruct the representation at the second level of quality. The device may comprise a decoder device. The device may comprise a display device. The device may be remote relative to a server system. The device may comprise a user device. The device may comprise a client device. The device may comprise a browser engine, for example, a web browser engine. The device may comprise a web browser. The data stream may be output via a data communications network.

In some examples, further reconstruction data is obtained. The further reconstruction data is useable to reconstruct a representation of the image at a third level of quality using the representation at the second level of quality. The third level of quality is higher than the second level of quality. As such, the third level of quality is also higher than the first level of quality. The further reconstruction data may be arranged in the data stream along with, or in addition to, the representation at the first level of quality and the reconstruction data for reconstructing the representation at the second level of quality. The further reconstruction data enables the device to reconstruct the representation at the third level of quality. Additional reconstruction data may also be obtained to enable the reconstruction of incrementally higher level of quality representations of the image.

As such, data useable to derive representations of an image at multiple different levels of quality may be included in a single compressed data stream. The data stream can be considered to represent a reconstruction chain corresponding to an ever-increasing resolution of the same image. This is in contrast to some known systems, such as JPEG, in which representations of an image at different levels of quality are transmitted separately, effectively as separate images. For example, a thumbnail or preview version of an image is transmitted as a separate JPEG file compared with the 'full resolution' version of the image. Therefore, an amount of data that is transmitted, received, stored and/or processed is reduced compared to such known systems, since the thumbnail version of the image is part of the reconstruction chain of the 'full resolution' image, instead of being a separate file.

The client device receives first compressed data which, when decoded, is useable to obtain the representation of the image at the first level of quality. The first compressed data comprises encoded data. The first compressed data may be received via a compressed data stream, for example via a network such as the Internet. In other examples, the first compressed data may be received or obtained from local memory or other storage.

The client device decodes the first compressed data to obtain the representation at the first level of quality. The client device then outputs for display the representation at the first level of quality. For example, the representation at the first level of quality may be rendered on a display screen. The representation may be rendered by a browser engine running on the client device. The representation at the first level of quality may comprise a thumbnail or preview image.

In response to a predetermined trigger event, second compressed data stream is decoded to obtain reconstruction data. In some examples, the second compressed data is discrete from the first compressed data. In other examples, the first compressed data and the second compressed data are first and second portions of a compressed data stream. The reconstruction data is useable to reconstruct a representation of part of the image at the second, higher level of quality using the representation at the first level of quality. The representation at the second level of quality is reconstructed using the representation at the first level of quality and the reconstruction data obtained via the second compressed data. In some examples, the representation at the first level of quality is up sampled to derive a preliminary representation of the image at the second level of quality. The preliminary representation is then combined with the reconstruction data to obtain the representation of the image at the second level of quality. For example, each reconstruction data element may be combined with a corresponding element of the preliminary representation to obtain a respective element in the reconstructed representation. The representation at the second level of quality is then output for display. For example, the representation at the second level of quality may be rendered. The predetermined trigger event may occur after the representation at the first level of quality is output for display. As such, the representation at the second level of quality may be reconstructed and/or output after the representation at the first level of quality is output for display.

In some examples, the predetermined trigger event comprises receiving user input. For example, when the representation at the first level of quality corresponds to a thumbnail image a user of the client device may click on the displayed thumbnail image in order to trigger reconstruction and display of the higher level of quality representation of the image.

In some examples, the second compressed data is received, e.g. downloaded, in response to the predetermined trigger event. As such, the second compressed data may not be downloaded until the occurrence of the trigger event, e.g. a user clicking on a thumbnail image. An amount of used bandwidth and/or downloaded data during a given time period may therefore be reduced. In other examples, the second compressed data is received prior to the predetermined trigger event, but is only decoded after the predetermined trigger event. Processing resources associated with decoding the second compressed data are therefore only used upon the occurrence of the trigger event. In some examples, the second compressed data is received, e.g. downloaded, without a trigger event. For example, the second compressed data may be received and/or fetched through use of pre-fetcher logic.

In some examples, the second compressed data is received, e.g. downloaded, at least partially in parallel with the decoding of the first compressed data and/or with the rendering of the representation at the first level of quality.

In some examples, the predetermined trigger event comprises a determination that a rendering of the representation at the first level of quality is completed. As such, reconstruction and/or display of the representation at the second, higher level of quality may be performed after the representation at the first level of quality has been fully rendered.

In some examples, the predetermined trigger event comprises a determination that the second compressed data has been received. As such, reconstruction and/or display of the representation at the second, higher level of quality may be performed in response to data useable to derive the relevant reconstruction data having been downloaded.

In some examples, the predetermined trigger event comprises a determination that the reconstruction data has been derived using the second compressed data. As such, reconstruction and/or display of the representation at the second, higher level of quality may be performed in response to the relevant reconstruction data having been decoded.

In some examples, the predetermined trigger event comprises a determination of an operating characteristic of the client device. The operating characteristic may comprise a display characteristic. For example, the operating characteristic may comprise a display and/or a processing capability of the client device.

In some examples, the client device decodes third compressed data to derive further reconstruction data. The further reconstruction data is useable to reconstruct a representation of part of the image at a third, even higher level of quality using the representation at the second level of quality.

The third compressed data may be decoded in response to a further predetermined trigger event. In some examples, the third compressed data is received in response to the further predetermined trigger event. In an example, the further predetermined trigger event comprises the representation at the second level of quality being displayed. As such, the representation at the second level of quality is displayed before the third compressed data is decoded. In an example, the further predetermined trigger event comprises the second representation being reconstructed. Decoding a data stream to obtain different sets of reconstruction data, namely sets of reconstruction data corresponding to reconstruction at different levels of quality, may be performed serially. In other examples, the first compressed data and the second compressed data are obtained and/or decoded in parallel. In other words, decoding the first compressed data to obtain the reconstruction data for reconstructing the representation at the second level of quality may be performed in parallel with decoding the second compressed data to obtain the further reconstruction data for reconstructing the representation at the third level of quality. Decoding multiple sets of reconstruction data in parallel may be more efficient in terms of processing than decoding the sets of reconstruction data in series.

The client device may reconstruct the representation at the third level of quality using the representation at the second level of quality and the further reconstruction data, and may output for display the representation at the third level of quality.

As such, the client device may iteratively reconstruct representations of the image at progressively higher levels of quality. In alternative examples, the client device can reconstruct the representation at the third level of quality without having to reconstruct the representation at the second level of quality. Reconstruction of the representation at the third level of quality may be performed in such examples using the representation at the first level of quality and the further reconstruction data, but not using the representation at the second level of quality. As such, the client device may 'access' a representation at a given level of quality without having to reconstruct representations at every level of quality below the given level of quality. An amount of processing may be reduced in such examples, compared to a case in which representations at each lower level of quality are progressively reconstructed in order to 'access' a representation at the given level of quality.

In some examples, a device receives first compressed data which, when decoded, is useable to obtain a representation of an image at the first level of quality. The device decodes the first compressed data to obtain the representation at the first level of quality. In some examples, the device outputs for display the representation at the first level of quality. Displaying at a given level of quality may comprise displaying at a resolution corresponding to the given level of quality.

The device determines whether the first level of quality has a predetermined relationship with one or more threshold levels of quality. In some examples, the predetermined relationship comprises the first level of quality being less than the one or more threshold levels of quality. In some examples, the predetermined relationship comprises the first level of quality being equal to the one or more threshold levels of quality. In some examples, the predetermined relationship comprises the first level being less than or equal to the one or more threshold levels of quality.

The one or more threshold levels of quality may be one or more particular level of quality in a tiered hierarchy comprising multiple levels of quality. The one or more threshold levels of quality may be determined by the device. In some examples, the one or more threshold levels of quality are determined by another entity, e.g. an encoder, and indicated to the device. The one or more threshold levels of quality may be considered to be a limit beyond which no further levels of quality in the hierarchy are reconstructed.

In some examples, a plurality of threshold levels of quality is used. Each of the plurality of threshold levels of quality may correspond to a respective one of multiple regions or tiles of the image. For example, a first threshold level of quality may apply to a first part of the image and a second, different level of quality may apply to a second part of the image. As such, different regions of the image may be reconstructed to different levels of quality in the hierarchy.

In response to determining that the first level of quality has the predetermined relationship with the one or more threshold levels of quality, second compressed data is decoded to obtain reconstruction data. The reconstruction data is useable to reconstruct a representation of part of the image at the second level of quality using the representation at the first level of quality. The representation at the second level of quality is then reconstructed using the representation at the first level of quality and the received reconstruction data. The reconstructed representation at the second level of quality is output for display at the second level of quality. In response to determining that the first level of quality does not have the predetermined relationship with the one or more threshold levels of quality, the representation at the first level of quality is output for display. In this case, the second compressed data is not decoded and the representation at the second level of quality is not reconstructed or output for display. As such, reconstruction data is only obtained and used up to a certain threshold level of quality. In some examples, the second compressed data is received in response to determining that the first level of quality has the predetermined relationship with the one or more threshold levels of quality.

The one or more threshold levels of quality are based on a display characteristic associated with the device.

In some examples, the display characteristic comprises an operating characteristic of the device. The operating characteristic may relate to a screen size of the client device. For example, the one or more threshold levels of quality may be determined based on the screen size of the device. The one or more threshold levels of quality may be lower for devices having a smaller screen size. For example, a first device may have a relatively large screen size and a second device may have a relatively small screen size. The one or more threshold levels of quality may be higher for the first device than for the second device. As such, the first device reconstructs higher quality representations of the image compared to the second device. The second device does not waste processing resources or data in decoding or processing data useable to reconstruct the higher quality representations.

In some examples, the operating characteristic relates to an orientation of the device and/or an orientation of a display associated with the device. In some examples, the operating characteristic relates to a device type. For example, devices of a predetermined type, e.g. personal computer, may have a higher threshold level of quality than devices of another predetermined type, e.g. mobile telephones. In some examples, the operating characteristic relates to a processing and/or a display capability of the device.

In some examples, the display characteristic comprises a size of a display window on a screen of the device. The size of the display window may be defined in an ECMAScript specification, using Hypertext Markup Language, HTML, run on the device. In some examples, the size is a number of pixels to be displayed. In other examples, the size is a percentage or fraction of a displaying element, e.g. a browser window. The device may determine the size of the display window, for example based on the content of the ECMAScript script, and determine the one or more threshold levels of quality accordingly. If it is determined that the size of the display window is above a certain threshold, it may be determined that the second compressed data is to be decoded and/or that the representation at the second level of quality is to be reconstructed. If, on the other hand, the size of the display window is below a certain threshold, it may be determined that the second compressed data is not to be decoded and/or that the representation at the second level of quality is not to be reconstructed. Not reconstructing the representation at the second level of quality may facilitate a reduction in undesired artefacts in the displayed output compared to a case in which the representation at the second level of quality is reconstructed regardless of the size of the display window. The representation at the second level of quality may be downsampled in order to fit in a relatively small display window. Downsampling the representation may introduce artefacts or other unwanted effects in the output. As such, adaptively decoding and/or reconstructing the hierarchically encoded image based on device and/or display characteristics may improve output quality as well as improving processing efficiency and/or reducing data usage.

The determination of the value of the display characteristic and/or the determination of the one or more threshold levels of quality may be performed at a server system and/or at the device itself. In some examples, the server system determines that the first level of quality has the predetermined relationship with the one or more threshold levels of quality, and transmits the second compressed data to the client device in response to such a determination. In other examples, the client device itself determines that the first level of quality has the predetermined relationship, and transmits a request to the server system to cause the server system to transmit the second compressed data to the client device.

As such, examples described herein enable image quality and/or resolution to be adapted automatically to different users based on one or more characteristics of the devices and/or browsers used by the users. A maximum level of quality may be determined for a given client device (e.g. a mobile phone). For example, the determined maximum level of quality may correspond to the maximum level of quality that the given client device is capable of displaying. Therefore, only reconstruction data useable to reconstruct representations of images up to and including the determined maximum resolution for the given client device may be downloaded and/or processed. Compression data relating to representations of images that are above the maximum resolution for the client device are not downloaded by the client device, thereby reducing an amount of data that is downloaded (and hence network bandwidth) without affecting user experience.

In some examples, the client device determines whether the second level of quality has a further predetermined relationship with the one or more threshold levels of quality. The further predetermined relationship may comprise the second level of quality being less than the one or more threshold levels of quality. In response to determining that the second level of quality has the further predetermined relationship with the one or more threshold levels of quality, third compressed data is decoded to obtain further reconstruction data useable to reconstruct a representation of the image at a third, even higher level of quality using the representation at the second level of quality. The representation at the third level of quality is then reconstructed using the representation at the second level of quality and the further reconstruction data. The representation at the third level of quality is then output for display at the third level of quality. In response to determining that the second level of quality does not have the further predetermined relationship with the one or more threshold levels of quality, the third compressed data is not decoded and the representation at the third level of quality is not reconstructed.

In some examples, a client device receives first compressed data which, when decoded, is useable to obtain a representation of an image at the first level of quality. The client device decodes the first compressed data to obtain the representation at the first level of quality, and causes the representation at the first level of quality to be displayed at the first level of quality. The client device then decodes second compressed data to obtain reconstruction data useable to enhance at least part of the displayed representation at the first level of quality to the second, higher level of quality. The reconstruction data is used to enhance the at least part of the displayed representation to the second level of quality. Enhancing part of the displayed representation may comprise upsampling part of the displayed representation and combining reconstruction elements of reconstruction data with corresponding elements in the upsampled representation.

Enhancing the representation from the first level of quality to the second level of quality effectively causes a representation at the second level of quality to be displayed in place of, or overlayed on, the displayed representation at the first level of quality. For example, the representation at the first level of quality may be displayed in a display window, and the representation at the second level of quality may be subsequently displayed in the same display window.

The representation at the first level of quality and the representation at the second level of quality may each be displayed with a same display size, even though the first level of quality comprises a first image resolution and the second level of quality comprises a second, higher image resolution.

In some examples, the reconstruction data is received after the representation at the first level of quality is displayed. The reconstruction data may be received from a server system in response to a request sent to the server system from the client device.

As such, a lower quality representation of the image is displayed to a viewer before the higher quality representation of the image has been reconstructed and/or rendered. In some examples, the lower quality representation is displayed even before the data useable to derive the higher quality representation has been received.

In some examples, the client device decodes third compressed data stream to obtain further reconstruction data. The further reconstruction data is useable to enhance the displayed representation at the second level of quality to a third, even higher level of quality. After obtaining the further reconstruction data, the client device enhances the displayed representation at the second level of quality to the third level of quality, resulting in a displayed representation at the third level of quality. The displayed representation at the third level of quality effective supersedes the displayed representation at the second level of quality.

One or more additional sets of reconstruction data may also be received, each corresponding to representations of the image at one or more higher levels of quality relative to the third level of quality.

As such, the image may be rendered at progressively higher levels of quality using successive sets of reconstruction data. This is in contrast to waiting for a representation of an image at a maximum level of quality to be downloaded, decoded and/or rendered, before which no other representations of the image are displayed. In a bandwidth-constrained scenario, for example when data is received via a cellular network, waiting for the 'full resolution' version of the image to be received, decoded and rendered may take a relatively long time. Progressive rendering allows a user to 'see' a displayed image before the 'full resolution' version has been processed. A user experience is therefore improved compared to a case in which progressive rendering is not performed.

Performing image reconstruction in accordance with a tiered hierarchy enables progressive rendering with a relatively fine level of granularity, since a representation of an image can be reconstructed and rendered successively for every level of the tiered hierarchy. For example, a tiered hierarchy having 6 or 7 levels of quality may be used. Starting at the bottom of the tiered hierarchy, progressively higher quality representations may be reconstructed. Performing progressive rendering with a relatively fine level of granularity results in an improved user experience.

In some examples, a browser engine displays a representation of an image at the first level of quality. The browser engine may be running on the client device, for example. The representation at the first level of quality may be received from the server system, for example based on a request from the browser. The representation is obtained from first compressed data. The representation may be displayed on a webpage. For example, the image may comprise part of the content of the webpage described by Hypertext Markup Language (HTML).

Second compressed data is decoded to obtain, for a selected target region of the image, reconstruction data. The selected target region may comprise one or more image tiles. The reconstruction data is useable to reconstruct a representation of the target region of the image at the second, higher level of quality.

The target region of the image is reconstructed at the second level of quality using the received reconstruction data. The browser engine then displays the representation of the target representation at the second level of quality on the webpage.

In some examples, the target region is selected by the browser engine and/or by the client device running the browser engine. The target region may correspond to a visible part of the webpage. As such, only the 'on screen' portion of an image may be downloaded, decoded and/or reconstructed. This involves less data and/or less processing than a comparative case in which an entire image, including regions which are not visible, is downloaded and/or decoded. In some examples, the target region of the image is selected based on an operating characteristic of the browser engine and/or is selected based on an operating characteristic of a device running the browser engine. The operating characteristic may relate to a display characteristic of the device.

In some examples, the second compressed data is received in response to a predetermined trigger event. In some examples, the second compressed data is decoded in response to the predetermined trigger event. The predetermined trigger event may comprise receiving user input. In some examples, the predetermined trigger event relates to use of a image zooming function on the browser engine. For example, a representation of a relatively large image may be displayed in its entirety at the first level of quality, and a user may then choose to 'zoom in' on a particular region of the image. In such a scenario, only the selected region of the image is reconstructed at the second, higher level of quality.

In some examples, third compressed data is decoded to obtain, for a further region of the image, further reconstruction data. The further region of the image may be distinct from the target region of the image, may be part of the target region, or may overlap with the target region. The further reconstruction data is useable to reconstruct a representation of the further region of the image at a further level of quality. In some examples, the further level of quality is higher than the second level of quality. For example, the further region may be displayed at a highest level of quality, the target region may be displayed at an intermediate level of quality, and the remainder of the image may be displayed at a lowest level of quality. In other examples, the further level of quality is lower than the second level of quality. For example, the further level of quality may be between the first level of quality and the second level of quality.

Although the above examples are described in the context of a browser engine running a webpage, the described method may alternatively be performed in the context of applications, for example downloadable applications, user interfaces, operating systems, or any other means capable of causing images to be displayed on a device.

In some examples, an encoding device obtains a set of reconstruction data elements useable to reconstruct a representation of an image at the second level of quality using a representation of the image at the first level of quality. Each reconstruction data element corresponds to an image element in the representation at the second level of quality. For example, each reconstruction data element may correspond to a particular pixel in the representation at the second level of quality.

An indication of a desired output size of encoded data is received. The desired output size may relate to a size of output data resulting from an encoding operation. For example, the output size may relate to an output file. The indication may be received in response to received user input. In some examples, the indication of the desired output size is based on an operating characteristic of a client device.

Based on the received indication, a data rate target is derived. An example of data rate is bitrate. The data rate target is derived for encoding each reconstruction data element in the set of reconstruction data elements. As such, the desired output size of the encoded data acts as a constraint when calculating the data rate targets. This is in contrast to some known systems in which the output size is unknown. The data rate target for encoding each reconstruction data rate element may be derived based on an average data rate target for encoding the set of reconstruction elements collectively. The average data rate target may be constant over a given time period.

Each of the sets of reconstruction data elements is encoded in accordance with the respective derived data rate target to obtain encoded data. The encoded data is then output, for example for processing by a client device.

The output size of the encoded data relates to the final size of the compressed image. The output size is a factor in download time and website latency, and is therefore relevant for user experience as well as data usage. Another factor that is relevant for user experience is image quality. Examples described herein enable simultaneous control of both image quality and latency, thereby improving user experience.

FIG. 1 shows an example of hierarchical scalable compression and decompression of a still image compared to conventional techniques. In particular, in FIG. 1 the bitrate needed for a conventional compression technique is compared with that needed for a hierarchical scalable compression technique according to examples described herein. In the conventional compression technique there are, for example, either a single image resolution format ("single mode") available or two image resolution formats available ("dual mode").

In dual mode, there is a smaller image resolution format (the "thumbnail image"—identified by the shaded area on the left) and a larger image resolution format (the "full image"—identified by the larger clear area on the left). The thumbnail image could represent a thumbnail-like image, for example a very small resolution image (e.g., 100×100 or 200×200 pixels) which is typically used to visualize an image without needing to download and decoded too much data and therefore allowing a relatively quick visualization.

However, such thumbnail image is not suitable for being displayed at a higher resolution, because it would lack the necessary details when re-sized (e.g., up-sampled) to fit a higher resolution size (e.g., 1280×720). For this reason, a second bigger format is provided (the full image), which is capable of being displayed at the higher resolution (e.g., 1280×720). However, the full image requires a significant higher amount of data to be encoded (represented by B3 in the figure) and therefore it would take a larger amount of time in order to be downloaded, decoded and displayed by typical display device. In typical systems, dual mode is used to allow a quick visualization of an image using the thumbnail image. Subsequently, once fully downloaded, the full image would be decoded and displayed in place of the thumbnail image once ready for visualization. In this way, typical systems require both images to be downloaded, processes and displayed, thus requiring a high data rate (e.g., B4) as well as a higher processing time to decoded and display, as well as higher use of computing resources due, for example, to the need to process a large image like the full image.

In single mode, only the full image is used. This would reduce the total amount of data to be downloaded but it would also mean that the system would require a larger amount of time before the image can be displayed. In this way, a user of the system would need to wait much longer before being able to see the page.

One of the technical problems in using either the single mode or the dual mode in a webpage, for example, is that the webpage would need to provide for a "space" in which the full image is to be displayed. This can be seen, for example, in normal browsers as a "boxed" area which is left blank until an image is displayed in that area. This typically occurs once the full image has been downloaded, decoded and, where necessary, rendered for displaying. This not only causes a delay in displaying the image on the webpage, but sometimes it results in the webpage to suddenly "move" or "change" once the image has been displayed, thus rendering the webpage hard to visualize.

Hierarchical scalable compression and decompression solves the above technical problems by both reducing the data rate needed to visualise a full image, as well as the way the image is downloaded, processed and progressively displayed without causing delay in the webpage loading and or unnecessary visualization distortions. As shown in FIG. 1, the hierarchical scalable compression provides for an image being divided in various layers (e.g., L1 to L6), wherein each successive higher layer builds on top of the previous lower layer(s) by adding details so that the image combining the previous lower layer(s) with the higher layer has a higher resolution and can be displayed at a higher resolution. Once the first lower layers (e.g., layers L1 to L3) have been downloaded and decoded the resulting image can be sent to a display for displaying. Since the data rate required for these lower layers is low (e.g., B1) the resulting image can be very quickly uploaded and displayed. In addition, given the special structure of the hierarchical scalable compression which, for example, allows the various layers to be processed separately and in parallel, the timing for processing the overall image (i.e., the combination of layers L1 to L3) is significantly reduced. U.S. Pat. Nos. 8,997,065, 8,948,248 and U.S. patent application Ser. No. 13/188,237, whose contents are herein incorporated by reference, describe further details of how a hierarchical scalable compression technique according to the examples described herein may be implemented. The overall image is designed for being displayed at a higher resolution (e.g., 1280×720) rather than at a lower resolution. The next layer (e.g., L4) is downloaded, decoded and combined with the existing image to further improve the quality by adding details. After that, the next layer (e.g., L5) is downloaded, decoded and combined with the existing image to further improve the quality by adding more details. Finally, the next layer (e.g., L6) is downloaded, decoded and combined with the existing image to further improve the quality by adding even more details. The final resulting image has a quality which is the same or higher than that available via the full image of the conventional compression techniques. Importantly, the image can be reconstructed up to a lower layer (e.g., L5) if the quality of the image is deemed to be sufficiently good for being display at the higher resolution (e.g., 1280×720), thus reducing even further the amount of data needed to be downloaded (e.g., B2 rather than B3). In this way, compared to traditional compression techniques, the image can be reconstructed in a flexible and adaptive manner to the level of quality required, without the need to download data which are not needed (e.g., layer L6 if the image reconstructed up to L5 is deemed of sufficient quality). With traditional compression techniques, the full image can be reconstructed only after all of the data have been downloaded, decoded and processed for display.

Another advantage of the proposed hierarchical scalable compression technique compared with the dual mode conventional compression systems is that the data required in order to obtain a full resolution image is significantly lower (e.g., up to B3 rather than B4).

Figure 2:
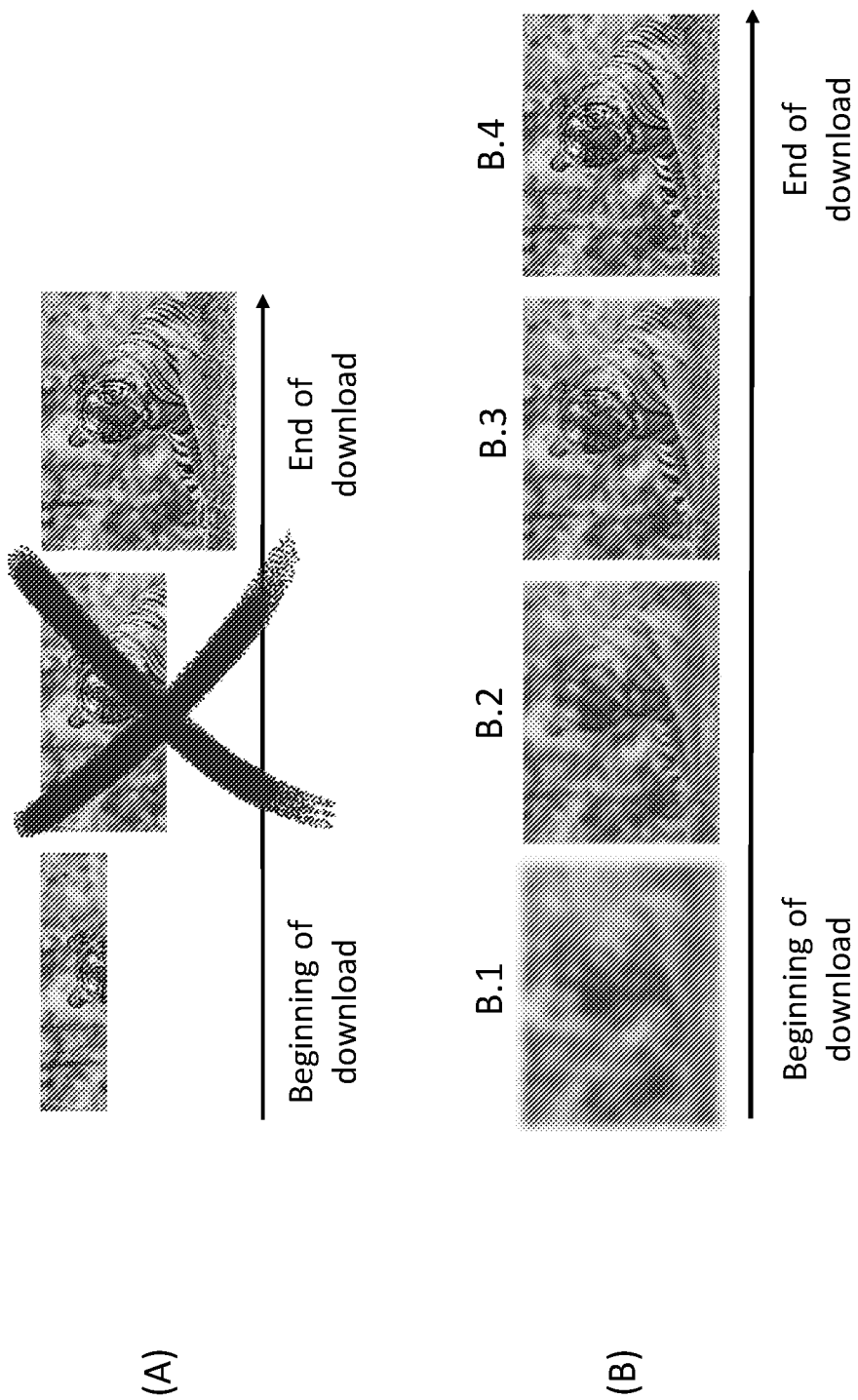
FIG. 2 shows an example of the use of hierarchical scalable compression and decompression of a still image, compared to conventional techniques.

FIG. 2 shows an example of how hierarchical scalable compression and decompression of a still image enhances still image rendering compared to conventional techniques. FIG. 2(A) shows how an image encoded with a conventional compression technique is being displayed. This image could correspond to the full image described above. As it can be seen, the image gets displayed at full resolution portion by portion, typically starting from the upper portion of the image and then slowly adding the remaining portions. This effect is typically due to the fact that the full image is downloaded and decoded in a serial manner, typically starting from the top left corner down to the bottom right corner, and therefore as the image gets decoded it gets processed and then displayed. This causes delay in displaying the full image as well as an unpleasant user experience. FIG. 2(B) shows how an image encoded using the proposed hierarchical scalable compression technique can be displayed. The full resolution image is built by adding details from the beginning of the download to the end of the download. For instance, a full resolution image—labelled as B.1 in FIG. 2—is immediately displayed once a first number of layers has been downloaded and decoded (e.g., layers L1 to L3 shown in FIG. 1 up to bitrate B1). The image is then improved as the subsequent layers are uploaded. For instance, once layer L4 has been downloaded and decoded, the details provided by layer L4 are added to the initial full resolution image to arrive at image labelled as B.2 in FIG. 2. The, once layer L5 has been downloaded and decoded, the details provided by layer L5 are added to image B.2 to arrive at image labelled as B.3 in FIG. 2. Finally, once layer L6 has been downloaded and decoded, the details provided by layer L6 are added to image B.3 to arrive at image labelled as B.4 in FIG. 2.

Figure 3:
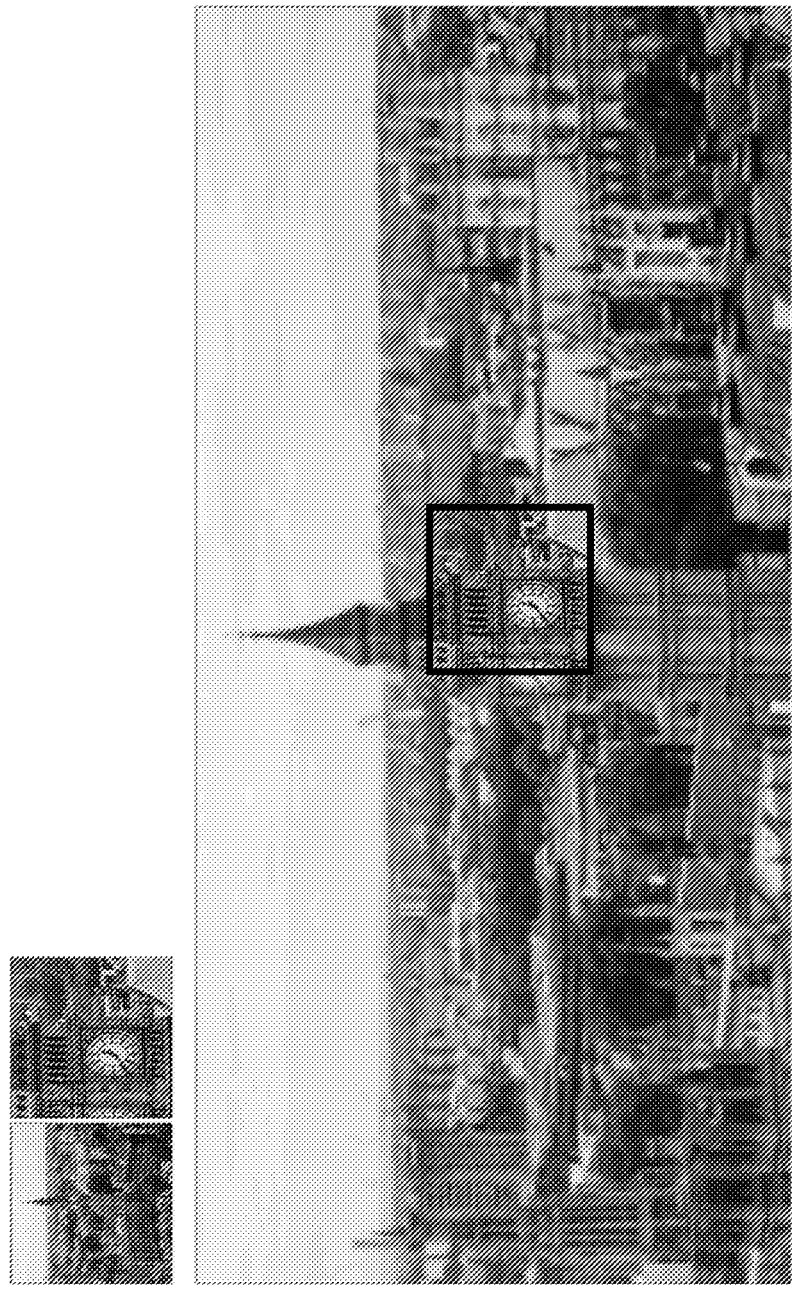
FIG. 3 shows an another example of the use of hierarchical scalable compression and decompression of a still image.

FIG. 3 shows an example of how hierarchical scalable compression and decompression of a still image may improve the visualization of the still image. As it can be seen, the proposed hierarchical scalable compression technique allows only a portion of the image to be downloaded at full resolution rather than the whole image. For example, the portion of the image within the square is reconstructed using all the layers from L1 to L6, whereas the rest of the image is reconstructed using only the layers L1 to L4. In this way, decoding of the image is optimized as only the relevant portions of the image are fully decoded. Also, it will be possible to zoom or crop the image, as for example it would be possible to select only a portion of a thumbnail image such as that shown in the top corner of FIG. 3, and only that portion would be fully reconstructed up to the highest resolution possible by downloading up to the highest layer (e.g., L6 in FIG. 1).

It should be understood that the above-described embodiments relate to the processing, encoding and decoding of still images. In alternative embodiments, similar techniques are used in relation to the processing, encoding and decoding of video images.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Numbered Statements of Invention

1. A method of processing image data, the method comprising:
   obtaining a representation of an image at a first level of quality;
   obtaining reconstruction data useable to reconstruct a representation of the image at a second, higher level of quality using the representation at the first level of quality;
   arranging the representation at the first level of quality and data useable to derive the reconstruction data into a compressed data stream; and
   outputting the compressed data stream for processing by a device to enable the device to reconstruct the representation at the second level of quality.
2. A method according to statement 1, wherein the representation at the first level of quality comprises a thumbnail image.
3. A method according to statement 1 or statement 2, wherein the first level of quality comprises a first image resolution and the second level of quality comprises a second, higher image resolution.
4. A method according to any of statements 1 to 3, comprising outputting the compressed data stream via a network.
5. A method according to any of statements 1 to 4, the method being performed by a server system.
6. A method according to any of statements 1 to 5, wherein the first level of quality and the second level of quality are part of a hierarchical image processing arrangement.
7. A method according to any of statements 1 to 6, wherein the obtaining the representation at the first level of quality comprises downsampling the representation at the second level of quality.
8. A method according to any of statements 1 to 7, wherein the obtaining the reconstruction data comprises:
   upsampling the representation at the first level of quality to derive a preliminary representation of the image at the second level of quality; and
   deriving the reconstruction data based on a comparison between the representation at the second level of quality and the preliminary representation at the second level of quality.
9. A method according to any of statements 1 to 8, the method comprising:
   obtaining further reconstruction data useable to reconstruct a representation of the image at a third, even higher level of quality using the representation at the second level of quality; and
   arranging the further reconstruction data in the compressed data stream to enable the device to reconstruct the representation at the third level of quality.
10. A method of processing image data, the method comprising:
    receiving first compressed data which, when decoded, is useable to obtain a representation of an image at a first level of quality;
    decoding the first compressed data to obtain the representation at the first level of quality;
    outputting for display the representation at the first level of quality; and
    in response to a predetermined trigger event:
    decoding second compressed data to obtain reconstruction data, the reconstruction data being useable to reconstruct a representation of part of the image at a second, higher level of quality using the representation at the first level of quality;
    reconstructing the representation at the second level of quality using the representation at the first level of quality and the reconstruction data; and
    outputting for display the representation at the second level of quality.
11. A method according to statement 10, wherein the representation at the first level of quality comprises a thumbnail image.
12. A method according to statement 10 or statement 11, the method comprising, in response to the predetermined trigger event, receiving the second compressed data.
13. A method according to any of statements 10 to 12, wherein the first level of quality comprises a first image resolution and the second level of quality comprises a second, higher image resolution.
14. A method according to any of statements 10 to 13, wherein the predetermined trigger event comprises receiving user input.
15. A method according to any of statements 10 to 13, wherein the predetermined trigger event comprises a determination that a rendering of the representation at the first level of quality is completed.
16. A method according to any of statements 10 to 13, wherein the predetermined trigger event comprises a determination that the second compressed data has been received.
17. A method according to any of statements 10 to 13, wherein the predetermined trigger event comprises a determination that the reconstruction data has been derived using the second compressed data.
18. A method according to any of statements 10 to 17, the method being performed at a user device.
19. A method according to statement 19, wherein the predetermined trigger event comprises a determination of an operating characteristic of the user device.
20. A method according to any of statements 10 to 19, the method comprising:

decoding third compressed data to derive further reconstruction data, the further reconstruction data being useable to reconstruct a representation of part of the image at a third, even higher level of quality using the representation at the second level of quality;

reconstructing the representation at the third level of quality using the representation at the second level of quality and the further reconstruction data; and outputting for display the representation at the third level of quality.

21. A method according to statement 20, wherein the third compressed data is decoded in response to a further predetermined trigger event.

22. A method according to statement 21, wherein the further predetermined trigger event comprises the representation at the second level of quality being displayed.

23. A method according to statement 22, wherein the further predetermined trigger event comprises the representation at the second level of quality being reconstructed.

24. A method according to statement 20, wherein the third compressed data is obtained in parallel with the second compressed data.

25. A method according to any of statements 10 to 24, wherein outputting a representation of an image for display comprises rendering the representation of the image by a browser engine.

26. A method according to any of statements 10 to 25, wherein the reconstructing the representation of the image at the second level of quality comprises:

upsampling the representation of the image at the first level of quality to derive a preliminary representation of the image at the second level of quality; and combining the preliminary representation with the reconstruction data to obtain the representation of the image at the second level of quality.

27. A method of processing image data, the method comprising:

decoding, at a device, first compressed data to obtain a first representation of an image at a first level of quality;

determining whether the first level of quality has a predetermined relationship with one or more threshold levels of quality, the one or more threshold levels of quality being based on a display characteristic associated with the device;

in response to determining that the first level of quality has the predetermined relationship with the one or more threshold levels of quality:

decoding second compressed data to obtain reconstruction data useable to reconstruct a second representation of the image at a second, higher level of quality using the first representation;

reconstructing the second representation using the first representation and the obtained reconstruction data; and outputting the second representation for display at the second level of quality; and in response to determining that the first level of quality does not have the predetermined relationship with the one or more threshold levels of quality, outputting the first representation for display at the first level of quality.

28. A method according to statement 27, the method comprising:

determining whether the second level of quality has a further predetermined relationship with the one or more threshold levels of quality; and in response to determining that the second level of quality has the further predetermined relationship with the one or more threshold levels of quality:

decoding third compressed data to obtain further reconstruction data useable to reconstruct a third representation of the image at a third, even higher level of quality using the second representation;

reconstructing the third representation using the second representation and the further reconstruction data; and outputting the third representation for display at the third level of quality.

29. A method according to statement 27 or statement 28, wherein the display characteristic comprises an operating characteristic of the device.

30. A method according to statement 29, wherein the operating characteristic relates to a screen size of the device.

31. A method according to statement 29, wherein the operating characteristic relates to an orientation of the device.

32. A method according to statement 29, wherein the operating characteristic relates to a device type of the device.

33. A method according to statement 29, wherein the operating characteristic relates to a processing and/or a display capability of the device.

34. A method according to statement 28, wherein the display characteristic comprises a size of a display window on a screen of the device.

35. A method according to statement 34, wherein the size of the display window is defined in an ECMAScript specification using Hypertext Markup Language, HTML.

36. A method according to any of statements 27 to 35, the method comprising determining the one or more threshold levels of quality.

37. A method according to any of statements 27 to 36, the method comprising determining the display characteristic.

38. A method according to any of statements 27 to 37, the method comprising, in response to determining that the first level of quality has the predetermined relationship with the one or more threshold levels of quality, receiving the second compressed data.

39. A method of processing image data, the method comprising:

receiving first compressed data which, when decoded, is useable to obtain a representation of an image at a first level of quality;

decoding the first compressed data to obtain the representation at the first level of quality;

causing the representation at the first level of quality to be displayed at the first level of quality;

decoding second compressed data to obtain reconstruction data useable to enhance at least part of the displayed representation at the first level of quality to a second, higher level of quality; and using the reconstruction data to enhance said at least part of the displayed representation at the first level of quality to the second level of quality.

40. A method according to statement 39, wherein the first level of quality comprises a first image resolution and the second level of quality comprises a second, higher image resolution.
41. A method according to statement 39 or statement 40, wherein the second compressed data is decoded after the representation at the first level of quality is displayed.
42. A method according to any of statements 39 to 41, wherein the second compressed data is received from a server system in response to a request sent to the server system.
43. A method of processing image data, the method comprising:
    receiving first compressed data which, when decoded, is useable to obtain a representation of an image at a first level of quality;
    decoding the first compressed data to obtain the representation at the first level of quality;
    displaying the representation at the first level of quality;
    decoding second compressed data to obtain, for a selected target region of the image, reconstruction data useable to reconstruct a representation of the target region of the image at a second, higher level of quality using the representation at the first level of quality;
    reconstructing the representation of the target region of the image at the second level of quality using the received reconstruction data; and
    displaying the representation of the target region of the image at the second level of quality.
44. A method according to statement 43,
    wherein the method is performed by a browser engine, and
    wherein the representation of the target region is displayed on a webpage.
45. A method according to statement 43 or statement 44, the method comprising selecting the target region of the image.
46. A method according to any of statements 43 to 45, wherein the second compressed data is received and/or decoded in response to a predetermined trigger event.
47. A method according to statement 46, wherein the predetermined trigger event comprises receiving user input.
48. A method according to statement 46 or statement 47, wherein the predetermined trigger event relates to use of an image zooming or image cropping function of a device.
49. A method according to any of statements 43 to 48, wherein the target region of the image corresponds to a visible part of a display.
50. A method according to any of statements 43 to 48, wherein the target region of the image corresponds to a gaze position of a user.
51. A method according to any of statements 43 to 50, wherein the target region of the image is selected based on user input.
52. A method according to any of statements 43 to 51, wherein the target region of the image is selected based on an operating characteristic of a device.
53. A method according to statement 52, wherein the operating characteristic of the device relates to a display characteristic of the device.
54. A method according to any of statements 43 to 53, the method comprising:
    decoding third compressed data to obtain, for a further region of the image, further reconstruction data useable to reconstruct a representation of the further region of the image at a further level of quality;
    reconstructing the representation of the further region of the image at the further level of quality using the received further reconstruction data; and
    displaying the representation of the further region of the image at the further level of quality.
55. A method according to statement 54, wherein the further level of quality is higher than the second level of quality.
56. A method according to statement 54, wherein the further level of quality is higher than the first level of quality and lower than the second level of quality.
57. A method of processing image data, the method comprising:
    obtaining a set of reconstruction data elements useable to reconstruct a representation of an image at a first level of quality using a representation of the image at a second, lower level of quality, each reconstruction data element in the set of reconstruction data elements corresponding to an image element in the representation at the first level of quality;
    receiving an indication of a desired output size of encoded data;
    deriving, based at least on the received indication, a data rate target for encoding each of the set of reconstruction data elements;
    encoding each of the set of reconstruction data elements in accordance with the respective derived data rate target to obtain the encoded data; and
    outputting the encoded data.
58. A method according to statement 57, wherein the data rate target for encoding each of the set of reconstruction data elements is derived based on an average data rate target for encoding the set of reconstruction data elements.
59. A method according to statement 58, wherein the average data rate target is constant over a given time period.
60. A method according to statement 27, where one or more of the threshold levels of quality are based on different image resolutions, target areas, or decoder device properties.
61. A method according to statement 61, where one or more of the threshold levels of quality are based on different image content categories, or based on the per-image values of quality metrics for different levels of quality, with said categories or metrics determined at either the server or the decoding device either before or not before the said image is requested by the device.
62. A method, where, the determination of a target area or a trigger event is followed by a message being passed to the server which prepares the server to allow the decoder to receive only restricted parts of the compressed data that exists on the server for each higher level of quality.
63. A method, where, the determination of a target area or a trigger event is followed by a message being passed to the server which causes the server to cause the encoder to produce modified compressed data for a higher level of quality, taking into account the size of all or of a restricted part of the modified compressed data in deriving data rate targets in statements 57 to 59.
64. A method according to statement 63, where, the message passed to the server causes the server to cause the encoder to produce modified compressed data that preferentially allocates data rate to certain areas within reconstruction data elements, in order to give the target area more accuracy than achieved with unmodified compressed data.

65. Apparatus arranged to perform a method according to any of statements 1 to 64.

66. A computer program comprising instructions which, when executed, cause an apparatus to perform a method according to any of statements 1 to 64.

The invention claimed is:

1. A method for facilitating a progressive reconstruction chain of an image by processing a single compressed data stream for the image in a manner so as to progressively derive different quality representations of the image and in a manner so as to enable different regions of one or more of the representations of the image to be reconstructed at different levels of quality, such that the one or more representations of the image are reconstructed during the reconstruction chain to include non-uniform levels of quality, the method being performed by a browser engine and comprising:

receiving, within the single compressed data stream, first compressed data that, when decoded, is useable to obtain a first representation of the image at a first level of quality having a first image resolution, wherein the first representation of the image includes a thumbnail version of the image;

decoding the first compressed data to obtain the first representation of the image at the first level of quality such that the thumbnail version of the image is obtained;

causing the thumbnail version of the image to be displayed on a webpage and at a particular size;

decoding second compressed data to obtain first reconstruction data usable to generate a preliminary representation of the image, wherein:

the preliminary representation of the image includes a first original subpart and a second original subpart, the first and second original subparts are reconstructed and displayed at a second level of quality such that the preliminary representation of the image has a uniform level of quality, and the second compressed data is (i) downloaded in response to a predetermined trigger event comprising a user selection of the displayed thumbnail version of the image and then subsequently decoded or, alternatively, (ii) received prior to the predetermined trigger event and then decoded after the predetermined trigger event;

decoding third compressed data to obtain second reconstruction data useable to enhance the second original subpart of the preliminary representation of the image from the second level of quality to a third, higher level of quality comprising a higher image resolution, wherein the second original subpart is less than an entirety of the preliminary representation of the image, resulting in generation of an enhanced representation of the image; and using the second reconstruction data to enhance said second original subpart of the preliminary representation of the image to create the enhanced representation of the image, which includes an enhanced subpart;

causing the enhanced representation of the image to be displayed on the webpage, wherein:

the enhanced subpart is displayed at the higher image resolution in place of the second original subpart of the preliminary representation of the image, such that the enhanced representation of the image is a subsequently reconstructed version of the preliminary representation of the image and is displayed in a manner so as to include non-uniform levels of quality, and as a result of using the single compressed data stream, the thumbnail version of the image is a part of the reconstruction chain of the enhanced representation of the image as opposed to the thumbnail version of the image being streamed separately.

2. A method according to claim 1, wherein the image is a still image.

3. The method according to claim 1, wherein decoding the third compressed data and using the second reconstruction data are performed in response to determining that the first level of quality is less than or equal to one or more threshold levels of quality.

4. The method according to of claim 1, wherein the third compressed data is decoded after the thumbnail version of the image is displayed.

5. The method according to claim 1, wherein the third compressed data is received from a server system in response to a request sent to the server system.

6. The method according to claim 1, wherein the thumbnail version of the image is a selected target region of a larger image.

7. The method according to claim 6, the method comprising selecting the target region using the browser engine and/or by a client device running the browser engine.

8. The method according to claim 6, wherein the target region corresponds to a visible part of the webpage.

9. The method according to claim 6, wherein the target region is selected based on an operating characteristic of the browser engine and/or an operating characteristic of a client device running the browser engine.

10. The method according to claim 1, wherein the third compressed data is received after the thumbnail version of the image is displayed.

11. A non-transitory computer-readable medium comprising instructions that are executable to cause one or more processors to:

Receive, within a single compressed data stream, first compressed data that, when decoded, is useable to obtain a first representation of an image at a first level of quality having a first image resolution, wherein the first representation of the image includes a thumbnail version of the image;

decode the first compressed data to obtain the first representation of the image at the first level of quality such that the thumbnail version of the image is obtained;

cause the thumbnail version of the image to be displayed on a webpage and at a particular size;

decode second compressed data to obtain first reconstruction data usable to generate a preliminary representation of the image, wherein:

the preliminary representation of the image includes a first original subpart and a second original subpart, the first and second original subparts are reconstructed and displayed at a second level of quality such that the preliminary representation of the image has a uniform level of quality, and the second compressed data is (i) downloaded in response to a predetermined trigger event comprising a user selection of the displayed thumbnail version of the image and then subsequently decoded or, alternatively, (ii) received prior to the predetermined trigger event and then decoded after the predetermined trigger event;

decode third compressed data to obtain second reconstruction data useable to enhance the second original subpart of the preliminary representation of the image from the second level of quality to a third, higher level of quality comprising a higher image resolution, wherein the second original subpart is less than an entirety of the preliminary representation of the image, resulting in generation of an enhanced representation of the image; and use the second reconstruction data to enhance said second original subpart of the preliminary representation of the image to create the enhanced representation of the image, which includes an enhanced subpart;

cause the enhanced representation of the image to be displayed on the webpage, wherein:

the enhanced subpart is displayed at the higher image resolution in place of the second original subpart of the preliminary representation of the image, such that the enhanced representation of the image is a subsequently reconstructed version of the preliminary representation of the image and is displayed in a manner so as to include non-uniform levels of quality, and as a result of using the single compressed data stream, the thumbnail version of the image is a part of a reconstruction chain of the enhanced representation of the image as opposed to the thumbnail version of the image being streamed separately.

\* \* \* \* \*